US012634069B2

(12) United States Patent
Petkar

(10) Patent No.: US 12,634,069 B2
(45) Date of Patent: May 19, 2026

(54) METHODS, SYSTEMS AND COMPUTER READABLE MEDIA FOR ANALYZING AND DISPLAYING WIRELESS SIGNAL DATA CAPTURED BY A WIRELESS SIGNAL CAPTURE AND DATA ANALYZER DEVICE

(71) Applicant: Keysight Technologies, Inc., Santa Rosa, CA (US)

(72) Inventor: Prasad Ganesh Petkar, Pune (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 529 days.

(21) Appl. No.: 18/073,666

(22) Filed: Dec. 2, 2022

(65) Prior Publication Data

US 2024/0187159 A1    Jun. 6, 2024

(51) Int. Cl.
H04L 5/00        (2006.01)
H04W 76/27       (2018.01)

(52) U.S. Cl.
CPC ........... H04L 5/0048 (2013.01); H04W 76/27 (2018.02)

(58) Field of Classification Search
CPC ....... H04L 5/0048; H04L 27/34; H04L 43/00; H04W 76/27; H04W 24/06; H04W 24/08; H04B 17/3913; H04B 17/00; G01R 13/00; G01R 23/00; G01R 23/16
See application file for complete search history.

(56) References Cited

U.S. PATENT DOCUMENTS 9,424,115 B2    8/2016  Jiang et al.
9,785,889 B2   10/2017  Bechet et al.

10,528,454 B1    1/2020  Baraty et al.
10,831,585 B2   11/2020  Gu
11,178,028 B1 * 11/2021  Maseedu ................. H04L 43/50
2003/0065967 A1   4/2003  Garcia et al.
2010/0229022 A1   9/2010  Anand et al.
2012/0011403 A1   1/2012  Bock et al.
(Continued)

FOREIGN PATENT DOCUMENTS

CN      101727332 A     6/2010
CN      101888645 A    11/2010
CN      102196478       9/2011

OTHER PUBLICATIONS

Wireshark—LTE RRC—Aug. 11, 2020 23:16:05 UTC (Year: 2020).*
(Continued)

*Primary Examiner* — Mohammed S Chowdhury

(57)    ABSTRACT

The subject matter described herein includes methods, systems, and computer readable media for analyzing and displaying wireless signal data captured by a wireless signal capture and data analyzer device. The method includes capturing wireless in-phase and quadrature (IQ) signals transmitted over an air interface between a real or emulated wireless base station and one or more real or emulated user equipment (UE) devices. The device stores parameters from the captured IQ signals in a log file and provides a graphical user interface (GUI) that displays the parameters and enables a user to select them. The GUI receives user inputs selecting one or more parameters and a selectable operators. The device then performs an operation corresponding to the selectable operator on the one or more parameters and generates an output and presents the output to the user via the graphical user interface.

9 Claims, 12 Drawing Sheets

(56) References Cited

U.S. PATENT DOCUMENTS

| | | | |
|---|---|---|---|
| 2015/0193319 A1 | 7/2015 | Southern | |
| 2016/0062815 A1 | 3/2016 | Ivanova et al. | |
| 2016/0092294 A1 | 3/2016 | Laaksonen | |
| 2016/0117211 A1* | 4/2016 | Makuch | G06F 11/0748 |
| | | | 714/37 |
| 2017/0255507 A1 | 9/2017 | Milor et al. | |
| 2018/0034805 A1 | 2/2018 | Eichen et al. | |
| 2018/0091336 A1 | 3/2018 | Mody et al. | |
| 2018/0211179 A1* | 7/2018 | Dzierwa | H04B 17/391 |
| 2019/0163553 A1 | 5/2019 | Ramegowda et al. | |
| 2019/0326986 A1* | 10/2019 | Heath | H04L 41/069 |
| 2020/0341888 A1 | 10/2020 | Sridhar et al. | |
| 2021/0250793 A1* | 8/2021 | Shi | H04W 24/08 |
| 2022/0248241 A1* | 8/2022 | Pickard | H04W 24/06 |
| 2024/0414072 A1* | 12/2024 | Nuggehalli | H04W 24/08 |

OTHER PUBLICATIONS

"5G/NR—RRC Overview," ShareTechnote, https://www.sharetechnote. com/html/5G/5G_RRC_Overview.html, pp. 1-12 (2022).

"5G RRC Messages—RRCSetupRequest," Linkedin, https://www. linkedin.com/pulse/5g-rrc-messages-rrcsetuprequest-manje-gowda-k-r-, pp. 1-7 (Aug. 15, 2021).

"Data Sheet—Viavi, 8150, Tetra AirAnalyzer," Viavi Solutions, pp. 1-8 (2018).

"Network & Service Analyzer—Most Efficient Troubleshooting and Optimization Solution for Mobile Networks and Services," Tektronix Communications, Product Datasheet—NSA, pp. 1-10 (May 2012).

N9042B UXA Signal Analyzer, [online], Downloaded from: https:// www. keysight. com/ gb/ en/product/N904 2B/uxa-signal-analyzer-2-hz-50-ghz.html on Mar. 31, 2024.

R&S® FSW Signal and spectrum analyzer, [online], Downloaded from: https://www. rohde-schwarz. com/us/products/test-andmeasurement/benchtop-analyzers/rs-fsw-signal-and-spectrumanalyzer_63493-11793.html on Mar. 31, 2024.

Combined Search and Examination Report for GB 2318394.0 (Jun. 4, 2024).

Notice of Allowance and Fee(s) Due for U.S. Appl. No. 17/197,194 (Nov. 10, 2021).

Non-Final Office Action for U.S. Appl. No. 17/197,194 (Jul. 22, 2021).

Commonly-assigned, co-pending U.S. Appl. No. 17/197,194 for "Methods, Systems and Computer Readable Media for Trouble-shooting Test Environments Using Automated Analysis of Log File Data" (Unpublished, filed Mar. 10, 2021).

Holkovic et al., "Using Rule-Based Decision Trees for Automatic Passive Diagnostics of the Network Problems," International Journal on Advances in Networks and Services, vol. 13, No. 1 & 2, pp. 1-10 (2020).

"Keysight 5G Protocol R&D Toolset," Keysight Technologies, Inc., pp. 1-14 (2018).

Office Action for GB 2318394.0 (Apr. 11, 2025).

Examination Report for GB 2318394.0 (Dec. 24, 2025).

* cited by examiner

340

420

500

| WaveJudge Messages List | | | | | | |
|---|---|---|---|---|---|---|
| Name | Start Time | Fr... | Slot Index | | Cell ID | |
| PRACH | 0001.22 | 766 | 19 | | 0 | 2 |
| PDCCH | 0007.72 | 767 | 12 | | 0 | 1 |
| DCI Format 1_0 | 0007.72 | 767 | 12 | | 0 | 1 |
| PDSCH | 0007.72 | 767 | 12 | | 0 | 1 |
| PUSCH | 0011.22 | 767 | 19 | | 0 | 2 |
| PBCH | 0011.72 | 768 | 0 | | 0 | 1 |
| PDCCH | 0012.22 | 768 | 1 | | 0 | 1 |
| DCI Format 1_0 | 0012.22 | 768 | 1 | | 0 | 1 |
| PDSCH | 0012.22 | 768 | 1 | | 0 | 1 |
| PRACH | 0021.22 | 768 | 19 | | 0 | 2 |
| PDCCH | 0027.72 | 769 | 12 | | 0 | 1 |
| DCI Format 1_0 | 0027.72 | 769 | 12 | | 0 | 1 |
| PDSCH | 0027.72 | 769 | 12 | | 0 | 1 |
| PUSCH | 0031.22 | 769 | 19 | | 0 | 2 |
| RRCSetupRequest | 0031.22 | 769 | 19 | | 0 | 2 |
| PBCH | 0031.72 | 770 | 0 | | 0 | 1 |
| PDCCH | 0032.22 | 770 | 1 | | 0 | 1 |
| DCI Format 1_0 | 0032.22 | 770 | 1 | | 0 | 1 |
| PDSCH | 0032.22 | 770 | 1 | | 0 | 1 |
| PDCCH | 0034.22 | 770 | 5 | | 0 | 1 |
| DCI Format 1_0 | 0034.22 | 770 | 5 | | 0 | 1 |
| PDSCH | 0034.22 | 770 | 5 | | 0 | 1 |
| PUCCH | 0035.72 | 770 | 8 | | 0 | 2 |
| PDCCH | 0039.22 | 770 | 15 | | 0 | 1 |
| DCI Format 1_0 | 0039.22 | 770 | 15 | | 0 | 1 |
| PDSCH | 0039.22 | 770 | 15 | | 0 | 1 |
| PDCCH | 0039.72 | 770 | 16 | | 0 | 1 |
| DCI Format 1_0 | 0039.72 | 770 | 16 | | 0 | 1 |
| PDSCH | 0039.72 | 770 | 16 | | 0 | 1 |
| PUCCH | 0040.72 | 770 | 18 | | 0 | 2 |
| PUCCH | 0041.22 | 770 | 19 | | 0 | 2 |
| PDCCH | 0044.22 | 771 | 5 | | 0 | 1 |
| PDCCH | 0044.22 | 771 | 5 | | 0 | 1 |
| DCI Format 1_0 | 0044.22 | 771 | 5 | | 0 | 1 |
| DCI Format 0_0 | 0044.22 | 771 | 5 | | 0 | 1 |
| PDSCH | 0044.22 | 771 | 5 | | 0 | 1 |
| PUCCH | 0045.72 | 771 | 8 | | 0 | 2 |
| PUSCH | 0046.22 | 771 | 9 | | 0 | 2 |
| PDCCH | 0049.22 | 771 | 15 | | 0 | 1 |

FIG. 5

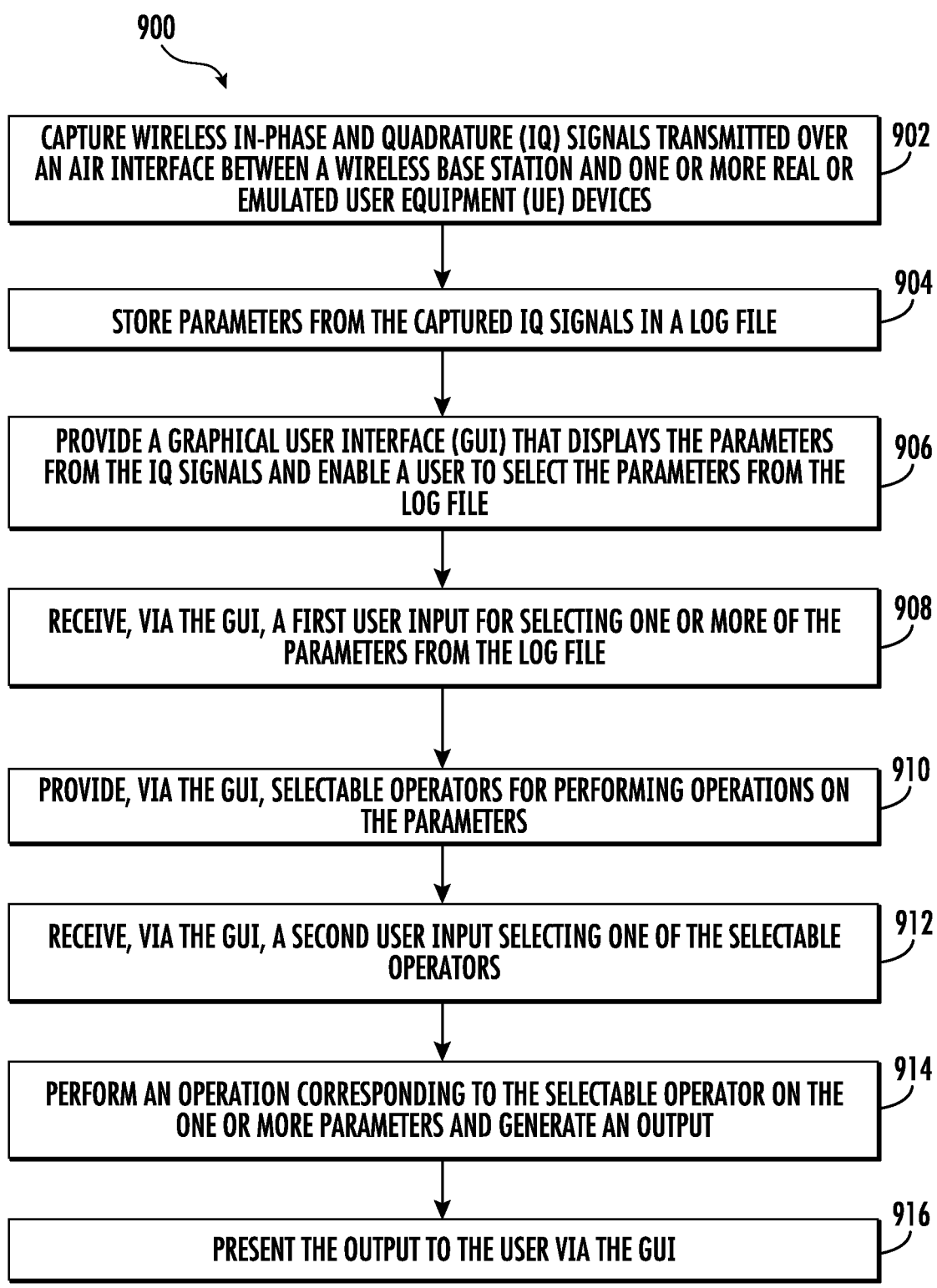

900

CAPTURE WIRELESS IN-PHASE AND QUADRATURE (IQ) SIGNALS TRANSMITTED OVER AN AIR INTERFACE BETWEEN A WIRELESS BASE STATION AND ONE OR MORE REAL OR EMULATED USER EQUIPMENT (UE) DEVICES — 902

STORE PARAMETERS FROM THE CAPTURED IQ SIGNALS IN A LOG FILE — 904

PROVIDE A GRAPHICAL USER INTERFACE (GUI) THAT DISPLAYS THE PARAMETERS FROM THE IQ SIGNALS AND ENABLE A USER TO SELECT THE PARAMETERS FROM THE LOG FILE — 906

RECEIVE, VIA THE GUI, A FIRST USER INPUT FOR SELECTING ONE OR MORE OF THE PARAMETERS FROM THE LOG FILE — 908

PROVIDE, VIA THE GUI, SELECTABLE OPERATORS FOR PERFORMING OPERATIONS ON THE PARAMETERS — 910

RECEIVE, VIA THE GUI, A SECOND USER INPUT SELECTING ONE OF THE SELECTABLE OPERATORS — 912

PERFORM AN OPERATION CORRESPONDING TO THE SELECTABLE OPERATOR ON THE ONE OR MORE PARAMETERS AND GENERATE AN OUTPUT — 914

PRESENT THE OUTPUT TO THE USER VIA THE GUI — 916

FIG. 9

METHODS, SYSTEMS AND COMPUTER READABLE MEDIA FOR ANALYZING AND DISPLAYING WIRELESS SIGNAL DATA CAPTURED BY A WIRELESS SIGNAL CAPTURE AND DATA ANALYZER DEVICE

TECHNICAL FIELD

The subject matter described herein relates to analyzing and displaying wireless signal data. More particularly, the subject matter described herein relates to methods, systems, and computer readable media for analyzing and displaying wireless signal data captured by a wireless signal capture and data analyzer device.

BACKGROUND

Wireless signal capture devices capture wireless in-phase and quadrature (IQ) signals, such as IQ signals carrying Radio Resource Control (RRC) messages transmitted over an air interface between a wireless base station and user equipment (UE) devices. RRC is a layer 3 Network Layer protocol containing major functions, such as connection establishment. RRC messages are communications between a base station and UE devices to perform the major functions. RRC messages include information that can lead to the discovery of causes for network issues such as a high Block Error Rate (BLER). However, user interfaces included in wireless signal capture devices are fixed, limiting the amount of data and manipulation of the data for the user to view and, thereby, making it difficult for a user to issue spot. The user is unable to select various parameters in the RRC messages captured and is hindered in identifying useful correlations between parameters. Further analysis of the captured IQ signals requires exporting the data to an analyzing device.

Further, while test platforms may generate log files and related data for debugging and/or other purposes, such test platforms may lack root cause analysis (RCA) functionality and/or other troubleshooting functionality. Hence, to resolve configuration or setup related issues, a network operator, equipment manufacturers, device manufacturers, and/or chipset manufacturers may need to manually review a log file in an effort to spot a root cause or reason for failure. However, the network operator and/or Equipment manufacturer and/or device manufacturers and/or Chipset manufacturers may require a relatively high level of technical expertise to effectively parse a log file and/or to perform RCA using the log file data.

SUMMARY

The subject matter described herein includes methods, systems, and computer readable media for analyzing and displaying wireless signal data captured by a wireless signal capture and data analyzer device. A method for analyzing and displaying wireless signal data captured by a wireless signal capture and data analyzer device includes, at a wireless signal capture and data analyzer device, capturing wireless in-phase and quadrature (IQ) signals transmitted over an air interface between a real or emulated wireless base station and one or more real or emulated user equipment (UE) devices. The wireless signal capture and data analyzer device stores parameters from the captured IQ signals in a log file and provides a graphical user interface that displays the parameters from the IQ signals, which enables a user to select the parameters from the log file. The wireless signal capture and data analyzer device, via the graphical user interface, receives a first user input for selecting one or more of the parameters from the log file and provides selectable operators for performing operations on the parameters. The wireless signal capture and data analyzer device also receives, via the graphical user interface, a second user input selecting one of the selectable operators. The wireless signal capture and data analyzer device then performs an operation corresponding to the selectable operator on the one or more parameters and generates an output and presents the output to the user via the graphical user interface.

A system for analyzing and displaying wireless signal data captured by a wireless signal capture and data analyzer device includes a processor, a memory communicatively connected to the processor, and a wireless signal capture and data analyzer device implemented using the processor and the memory. The wireless signal capture and data analyzer device is configured for: capturing wireless IQ signals transmitted over an air interface between a a real or emulated wireless base station and one or more real or emulated UE devices; storing parameters from the captured IQ signals in a log file; providing a graphical user interface that displays the parameters from the IQ signals and enables a user to select the parameters from the log file; receiving, via the graphical user interface, a first user input for selecting one or more of the parameters from the log file; providing, via the graphical user interface, selectable operators for performing operations on the parameters; receiving, via the graphical user interface, a second user input selecting one of the selectable operators; performing an operation corresponding to the selectable operator on the one or more parameters and generating an output; and presenting the output to the user via the graphical user interface.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which:

FIG. 5 is a diagram illustrating an embodiment of a graphical user interfaces displaying messages from the physical layer;

FIG. 9 is a flow chart illustrating an example process for troubleshooting test environments using automated analysis of log file data.

DETAILED DESCRIPTION

Figure 1:
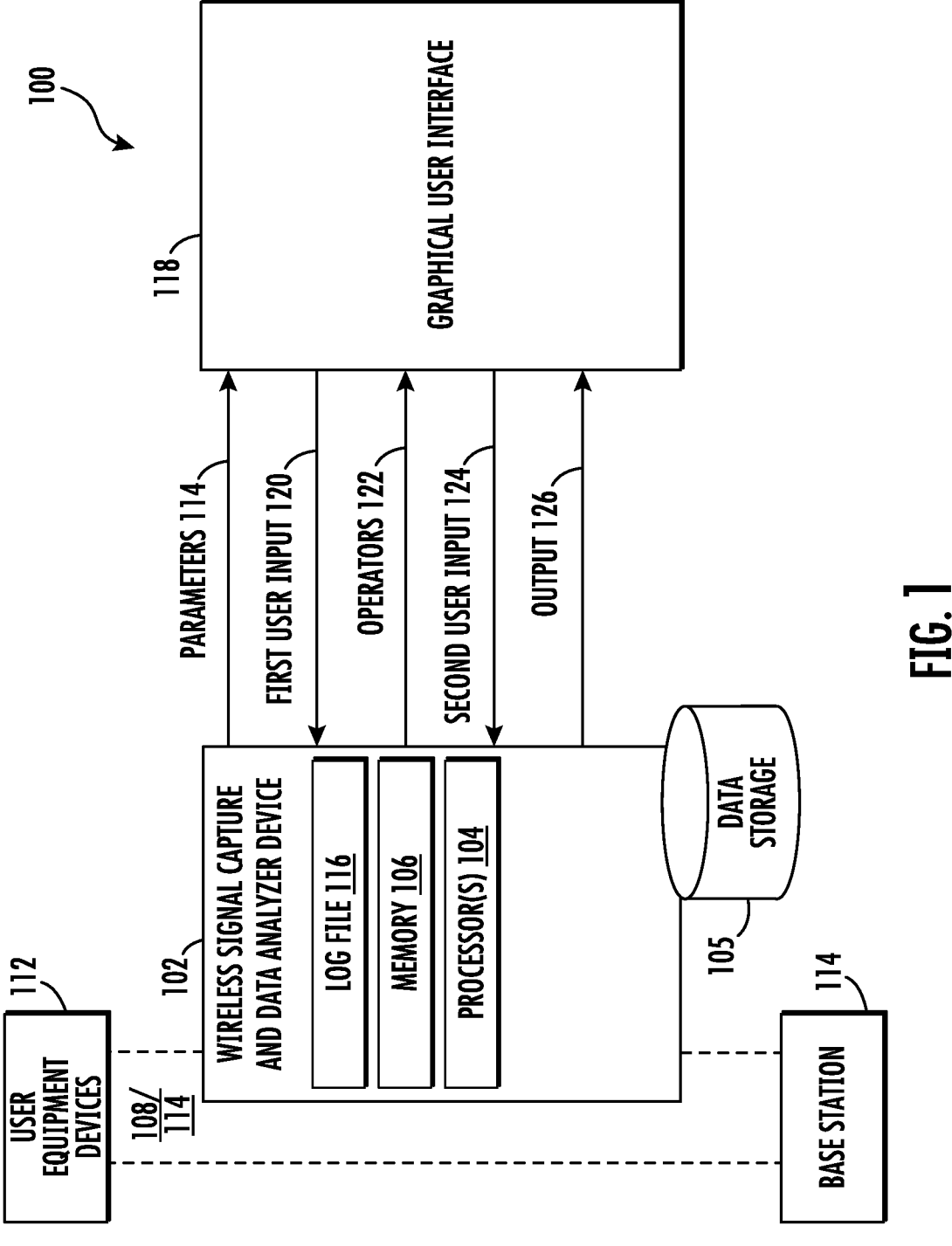
FIG. 1 is a block diagram illustrating an example test environment for troubleshooting using automated analysis of log file data.

The subject matter described herein includes methods, systems, and computer readable media for analyzing and displaying wireless signal data captured by a wireless signal capture and data analyzer device. The wireless signal capture and data analyzer device captures communication, specifically In-phase and Quadrature (IQ) signals, between a base station and one or more user equipment (UE) devices. A base station may include an instrument functioning as a base station, such as an eNodeB (eNB) in a 4G network or an gNodeB (gNB) in a 5G network or an emulated base station. The captured IQ signals may carry Radio Resource Control (RRC) messages.

The wireless signal capture and data analyzer device may capture signals transmitted between network elements that follow 3rd Generation Partnership Project (3GPP) specifications. In some embodiments, the wireless signal capture and data analyzer device conducts a passive capture of the traffic from a gNodeB and a UE device without causing interference. The wireless signal capture and data analyzer device may capture an open-ended or a defined time period of IQ signals. In some embodiments, the wireless signal capture and data analyzer device can store hours of IQ signals captured in memory. The wireless signal capture and data analyzer device may generate log files (e.g., ".alf", ".rtt", ".pcap", ".iq", ".xml", etc.) of the captured IQ signals. In some embodiments, the wireless signal capture and data analyzer device may implement root cause analysis (RCA) to identify root causes for failures (e.g., errors).

Advantageously, in accordance with some aspects of the subject matter described herein, network testing and related configuration may be improved by selecting and manipulating parameters of captured IQ signals to identify root causes of issues. For example, a user may select one or more parameters of the captured IQ signals and an operator to apply to the one or more parameters, wherein a graphical user interface (GUI) of the wireless signal capture and data analyzer device displays an output of the selection. Operators may include statistical operators, such as minimum, maximum, standard deviation, mean, median, mode, and the like. A user may select, for example, a first parameter and a second parameter and "correlate" as the operator, and the GUI will display a visual representation of both parameters for the user to compare. The output may include the first and second parameters graphed on the same chart over time or a side-by-side comparison including each selected parameter displayed on separate and adjacent graphs. This allows a user to select which parameters and features of the parameters to view on the GUI to quickly identify patterns and/or correlations, which can aid in identifying root causes of issues.

Reference will now be made in detail to example embodiments of the subject matter described herein, examples of which are illustrated in the accompanying drawings. Wherever possible, the same reference numbers will be used throughout the drawings to refer to the same or like parts.

FIG. 1 is a block diagram illustrating a system 100 for analyzing and displaying wireless signal data captured by a wireless signal capture and data analyzer device 102. Wireless signal capture and data analyzer device 102 may include one or more processor(s) 104 and a memory 106. Wireless signal capture and data analyzer device 102 may be implemented using processor 104 and memory 106 to execute any steps described in this disclosure. Processor(s) 104 may represent or include a physical processor, a general purpose microprocessor, a single-core processor, a multi-core processor, a field-programmable gateway array (FPGA), and/or an application-specific integrated circuit (ASIC) for executing software and/or logic stored in memory 106. Memory 106 may represent one or more computer readable media for storing data, logic, or other information.

Wireless signal capture and data analyzer device 102 may represent any suitable entity (e.g., one or more computing platforms or a testing tool implemented using processor(s) 104) for performing various aspects associated with analyzing log file data, performing troubleshooting, and/or determining resolution recommendations. Wireless signal capture and data analyzer device 102 may include one or more processors, one or more memories, and may include one or more communications interface(s). Wireless signal capture and data analyzer device 102 may support 2G, 3G, 4G, 5G, wireless location area network (WLAN), and/or future networks.

Wireless signal capture and data analyzer device 102 may include data storage 105. Data storage 105 may represent any suitable entity (e.g., a computer readable medium, a database, a storage device, or memory) for storing troubleshooting related data, error or issue related information data, reason or cause related information, resolution related information, and/or other data. For example, data storage 105 may store associations between 3rd Generation Partnership Project (3GPP) error codes (e.g., error codes gleaned from 3GPP technical specifications) and corresponding reasons or root causes of errors (e.g., resolution recommendations gathered from an issue tracking system or a software development data store).

Data storage 105 may represent any suitable entity (e.g., a computer readable medium, a database, a storage device, or memory) for storing test session related data, log file data, received traffic metrics, and/or other data. For example, data storage 105 may store copies of messages or related details from messages sent or received by an associated network node. In some embodiments, data storage 105 may also include information usable for analyzing log file data, troubleshooting error codes, and/or determining resolution recommendations for resolving various errors or issues.

Still referring to FIG. 1, wireless signal capture and data analyzer device 102 captures wireless in-phase and quadrature (IQ) signals 108 transmitted over an air interface between a real or emulated wireless base station 110 and one or more real or emulated user equipment (UE) devices 112, including IQ signals 108 from base station 110 and IQ signals 108 from UE devices 112. Base station 110 may include a device operating as a real or emulated base station such as a gNodeB (gNB) in a 5G network and an eNodeB (eNB) in a 4G network. UE devices 112, which may include real and emulated UEs, are devices used directly by end users and may include cellular phones, tablets, phablets, laptop computers, and the like.

Figure 7:
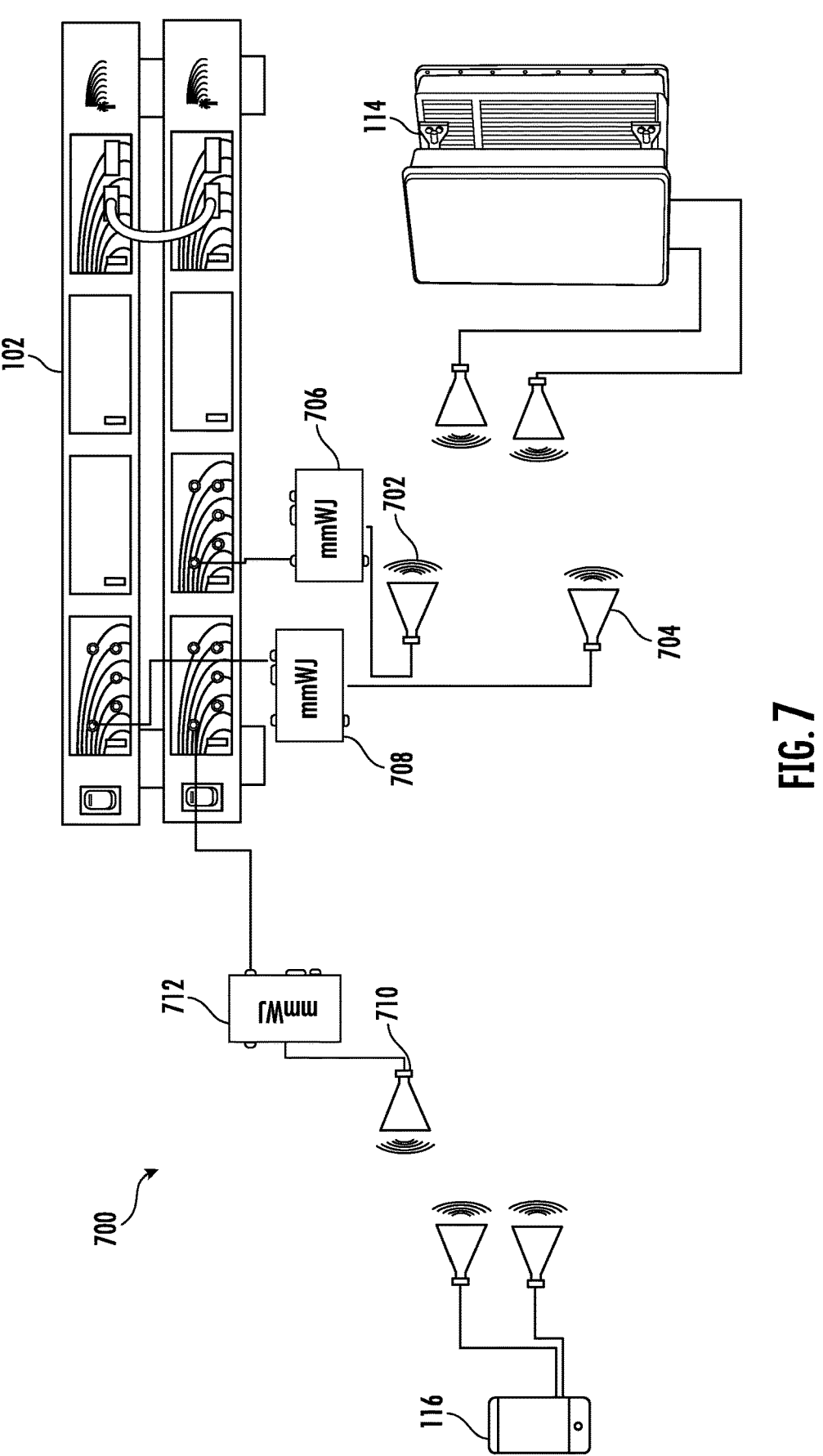
FIG. 7 is a diagram illustrating an exemplary topology of a wireless signal capture and data analyzer device using an over the air (OTA) mode.
Figure 8:
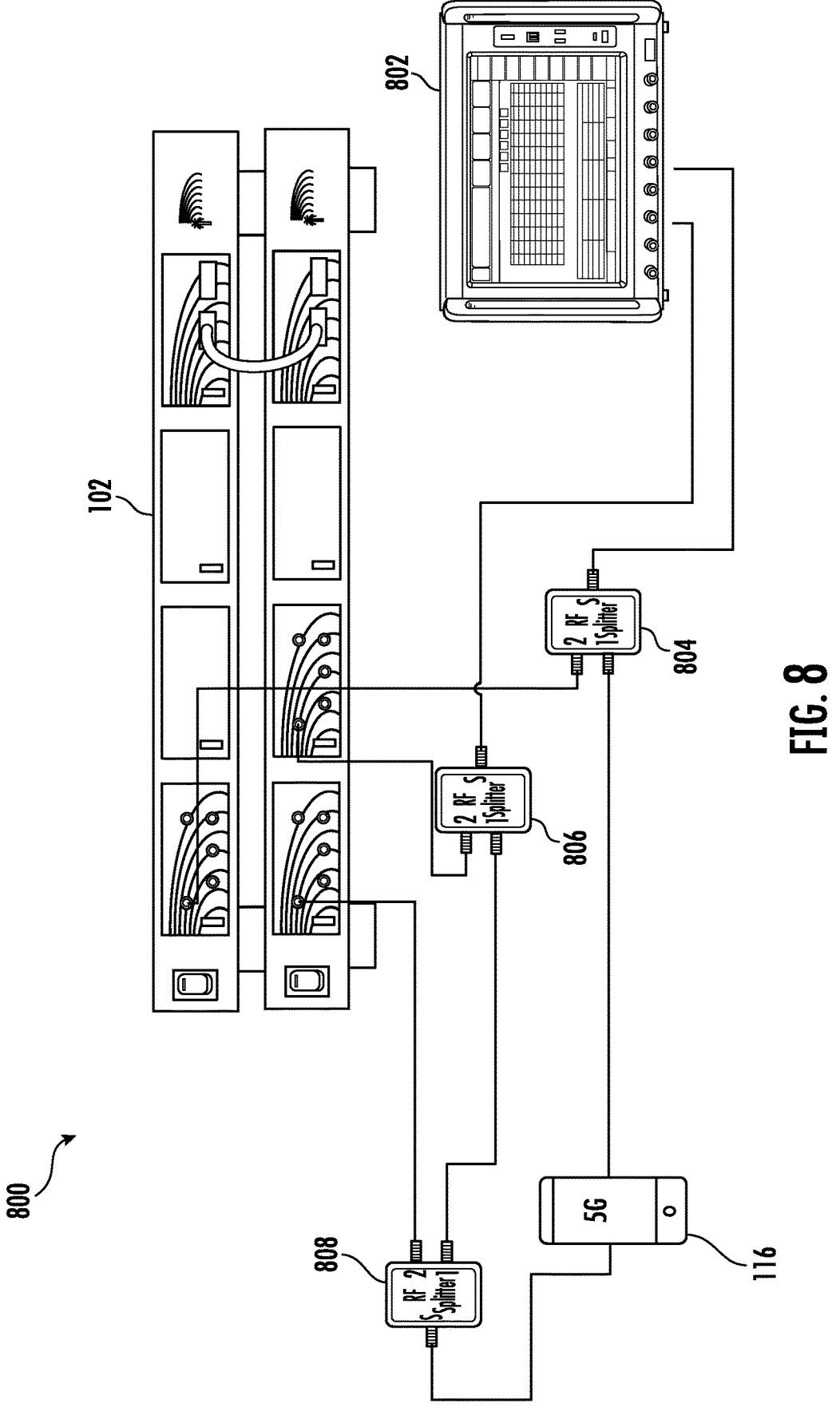
FIG. 8 is a diagram illustrating an exemplary topology of a wireless signal capture and data analyzer device using a conducted mode.

IQ signals 108 include Information Elements (IEs), which are groups of information pertaining to the corresponding IQ signal 108. IEs may include a field label, length indicator, value, Quality of Service (QOS) definitions, setup parameters, user identifiers, and/or the like. IQ signals 108 may include IQ signals carrying Radio Resource Control (RRC) messages between base station 110 and UE devices 112. Each RRC message may include one or more IEs. In some embodiments, wireless signal capture and data analyzer device 102 captures IQ signals 108 from a complete gNodeB (gNB), which is a node in a cellular 5G network functioning similarly to base station 110 that provides connectivity between UE devices 112 and an evolved packet core (EPC). Wireless signal capture and data analyzer device 102 may capture IQ signals 108 from an Open Radio Access Network (ORAN) based gNB. In some embodiments, wireless signal capture and data analyzer device 102 may capture IQ signals 108 in radiative, or over the air (OTA), testing as shown in FIG. 7 and/or conducted testing as shown in FIG. 8 where the wireless signal capture and data analyzer device 102 is physically connected to one or more EU devices 112 and/or base station 110.

Wireless signal capture and data analyzer device 102 stores parameters 114 of the captured IQ signals 108 in a log file 116. Parameters 114 include Information Elements (IEs). Wireless signal capture and data analyzer device 102 may also store parameters 114 from sources in addition to IQ signals 108 the wireless signal capture and data analyzer device 102 captures, such as IQ signals 108 and their IEs, in log files imported from other sources in various file formats including without limitation txt, csv, sdf,hdf5, bin, iq, UXM, eCPRI, pcap, etc. In some embodiments, wireless signal capture and data analyzer device 102 uses each of the IEs it receives, either by captured IQ signals 108 or imported log files 116, as separate parameters 114 such as all IEs reported by all layers including the physical layer, Media Access Control (MAC), Radio Link Control (RLC), RRC, Packet Data Convergence Protocol (PDCP), and Non Access Stratum (NAS). Parameters 114 may include parameters from the RRC messages captured by wireless signal capture and data analyzer device 102. In some embodiments, log file 116 is stored onsite, such as in memory 106 and/or in data storage 105. Log file may be store remotely such as in a remote database from which wireless signal capture and data analyzer device 102 can retrieve the log file 116.

Wireless signal capture and data analyzer device 102 provides a graphical user interface (GUI) 118 that displays parameters 114, such as IEs, from IQ signals 108 and enables a user to select parameters 114 from log file 116. In some embodiments, wireless signal capture and data analyzer device 102 comprises GUI 118. In some embodiments, GUI 118 is communicatively connected to wireless signal capture and data analyzer device 102, receiving information from the wireless signal capture and data analyzer device 102 and sending information to the wireless signal capture and data analyzer device 102, as further described below.

Wireless signal capture and data analyzer device 102 receives, via graphical user interface 118, a first user input 120 for selecting one or more of parameters 114 from log file 116. In some embodiments, all IEs captured or imported to wireless signal capture and data analyzer device 102 may be parameters 114 selectable by the user. First user input 120 may include a plurality of selected parameters. For example, first use input 126 may include a first selected parameter of parameters 114, a second selected parameter of the parameters 114, a third selected parameter of the parameters 114, and/or so on. First user input 120 that wireless signal capture and data analyzer device 102 receives may include a selected one or more parameters 114 from the RRC messages.

Wireless signal capture and data analyzer device 102 provides, via graphical user interface 118, selectable operators 122 for performing operations on parameters 114. Operators 122 may include standard mathematical operators such as addition (+), subtraction (−), multiplication (*), division (/), percentage (%), logarithm, and/or root (√). Operators 122 may include statistical operators such as, for example, minimum, maximum, average, mean, median, standard deviation, sum, count, mode, and the like. Operators 122 may include rate as determined by count over a given time interval. Wireless signal capture and data analyzer device 102 receives, via graphical user interface 118, a second user input 124 selecting one of selectable operators 122. Second user input 124 may include one or more statistical operators to perform on the one or more selected parameters 114, such as one or more selected parameters 114 from the RRC messages.

Wireless signal capture and data analyzer device 102 performs an operation corresponding to selectable operator 122 selected by the user on the one or more selected parameters 114. For example, if user selects parameter 114 DCI Format 0_0 for first user input 120 and operator 122 count for second user input 124, then wireless signal capture and data analyzer device 102 generates a count of occurrences of DCI Format 0_0 from the RRC messages, which is the number of instances base station 110 sent DCI Format 0_0. As another example, if user selects parameter 114 paging for first user input 120 and operator 122 count for second user input 124, then wireless signal capture and data analyzer device 102 generates a count of occurrences of paging message from the RRC messages. If user selects parameter 114 RRCReconfiguration for first user input 120 and operator 122 count for second user input 124, then wireless signal capture and data analyzer device 102 generates a count of occurrences of RRCReconfiguration message. If user selects parameter 114 RRCReconfiguration-Complete for first user input 120 and operator 122 count for second user input 124, then wireless signal capture and data analyzer device 102 generates a count of occurrences of RRCReconfigurationComplete message. In some embodiments, first user input 120 may include a plurality of selected parameters 114 to which wireless signal capture and data analyzer device 102 applies the selected operator 122, such as count applied to the first user inputs 126 DCI Format 0_0 and DCI Format 0_1 to generate the total count of occurrences of DCI Format 0_0 and DCI Format 0_1 from the RRC messages. Second user input 124 may include input for correlating first and second selected parameters 114 received in first user input 120, which allows the user to compare the first and second parameters 114. For example, wireless signal capture and data analyzer device 102 may output, as discussed in further detail below, a first graph of first selected parameter 114 and a second graph of second selected parameter 114 for user to compare the first and second selected parameters 114.

In some embodiments, user may additionally input an option to compare results of one or more operators 122 operating on multiple parameters 114. Using prior examples, user may input a command to compare count for RRCReconfiguration messages and count for RRCReconfigurationComplete messages, then wireless signal capture and data analyzer device 102 may compare the values of the count of these messages. In some embodiments, user may input a compare option and select a plurality of parameters 114 and corresponding operators 122 to operate on the selected parameters 114. When the compare option is selected, a first selected parameter 114 and a corresponding first selected operator 122 may be considered first user input 120, a second selected parameter 114 and a corresponding second selected operator 122 may be considered second user input 120, and so on. For example, if user selects parameter 114 RRCReconfiguration and operator 122 timestamp for first user input 120 and parameter 114 RRCReconfigurationComplete and operator 122 timestamp for second user input 124, then wireless signal capture and data analyzer device 102 generates a difference of the time between the messages, which provides the delay between the two messages. It is understood that input labels described herein such as first user input 120, second user input 124, third user input, and the like may be interchangeable. Similarly, a plurality of inputs may be considered a single user input or separate user inputs.

In some embodiments, wireless signal capture and data analyzer device 102 may receive one or more time intervals selected by the user, which may be included in first user input 120 and/or second user input 124. The one or more selected time intervals may correspond to time intervals in which wireless signal capture and data analyzer device 102 receives IQ signals 108, such as RRC messages. The wireless signal capture and data analyzer device 102 then performs the selected operator 122 on the one or more selected parameters 114 of the IQ signals 108 received within the one or more selected time intervals. Therefore, the user is able to analyze IQ signals 108 within one or more selected time intervals. For example, the user may select DCI Format 0_1 as parameter 114, count as operator 122, and 10:00 am to 11:00 am as the time interval, then wireless signal capture and data analyzer device 102 provides a count of the instances base station 110 sent DCI Format 0_1 between 10:00 am and 11:00 am.

Wireless signal capture and data analyzer device 102 generates an output 126 of a visual representation of the operation of the one or more selected operators 122 on the one or more selected parameters 114. Wireless signal capture and data analyzer device 102 presents output 126 to the user via graphical user interface 118. Output may include numbers, tables, and/or graphs such as line graph, bar graph, pie chart, scatter plot, and the like. Output 126 may include a graph that displays a correlation between values of the first and second parameters 114. For example, first and second parameters 114 may each be graphed with respect to time, allowing a user to identify values, changes, and rates of changes of first and second parameters 114 at corresponding times. Output 126 may include a visual representation of the first and second parameters 114 in relation to time, such as the parameters 114 plotted on a y-axis and time on an x-axis. In some embodiments, output 126 may include representing a plurality of selected parameters 114, such as first and second parameters 114, on a single graph, such as a scatter plot, line graph, bar graph, or pie chart, wherein each parameter 114 may be distinguishable by a unique shading, color, line type, etc. Output 126 may further include a key to identify how each parameter 114 is visually represented in the GUI 118. In some embodiments, output 126 may display correlations between selected parameters 114 by representing each of the selected parameters 114 on different graphs for a side-by-side comparison. For example, each selected parameter 114 may be represented on a line graph wherein the parameter 114 is represented on a y-axis and time is represented on an x-axis. In some embodiments, GUI 118 displays the graphs of the multiple parameters 114 simultaneously to allow easy comparison.

Output 126 may display a pattern between parameters 114 that aids the user in identifying a root cause of an issue. For example, output 126 may show that a low receiver level for UE devices 112 increases when radio frequency (RF) power level is increased, thus identifying the possible root cause of the low receiver level. Another parameter 114 may include the block error rate (BLER), which is the ratio of the number of transport blocks received in error to the total number of blocks transmitted over a certain number of frames. A user may select BLER and another parameter 114, such as the RF level, to view from output 126 if there is a relationship or inverse relationship between the selected parameters 114.

In some embodiments, output 126 may display a correlation between the first and second parameters 114 independent of time, wherein the first parameter 114 is represented on a y-axis and the second parameter 114 is represented on an x-axis. Wireless signal capture and data analyzer device 102 may determine a best fit equation in an automated process, which may include determining whether a linear equation, quadratic equation, logarithmic equation, and/or exponential equation best fits the plotted data. Output 126 may also include the determined equation, display the equation on the graph, and/or determine an $R^2$ value when applicable to provide a numerical value of the correlation.

Output 126 may represent the operation of the one or more selected operators 122 on the one or more selected parameters 114 numerically in a chart, such as a listing of the minimum, maximum, average, and/or any of the statistical operators 122 described in this disclosure of one or more selected parameters 114.

Figure 2:
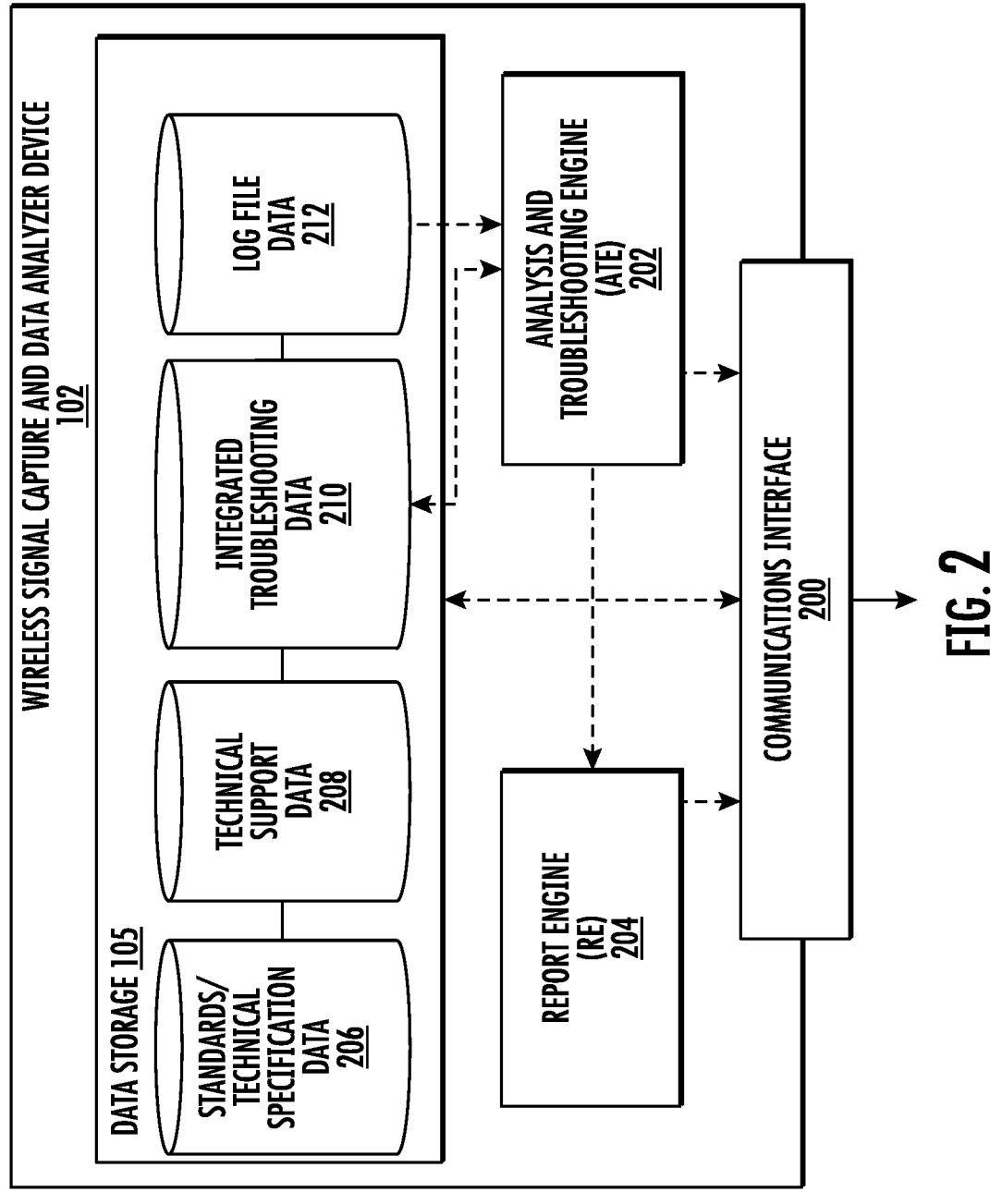
FIG. 2 is a block diagram illustrating an example data analyzer.

FIG. 2 is a block diagram illustrating an example wireless signal capture and data analyzer device 102. Referring to FIG. 2, wireless signal capture and data analyzer device 102 may include one or more processors, one or more memories, and may include one or more communications interface(s) 200, an analysis and troubleshooting engine (ATE) 202, a report engine (RE) 204, data storage 105 containing standards and/or technical specification (standards/technical specification) data 206 (e.g., 3GPP error codes or other related information), technical support data 208 (e.g., identified issues and solutions provided by a technical support technician or a related data store), integrated troubleshooting data 210 (e.g., associations between error codes and possible solutions from disparate data sources), and log file data 212 (e.g., log files of various formats from one or more test tools or platforms).

Wireless signal capture and data analyzer device 102 may include one or more processors, one or more memories, and may include one or more communications interface(s) 200. Communications interface(s) 200 may represent any suitable entity or entities (e.g., one or more network interface cards (NICs), physical processors, and/or other hardware) for sending or receiving communications. For example, communications interface(s) 200 may include one or more interfaces for communicating with various nodes and/or related storage, e.g., to obtain or access log file data captured by wireless signal capture and data analyzer device 102 and/or other entities, e.g., network taps. In another example, communications interface(s) 200 may include a graphical user interface, such as GUI 118 shown in FIG. 1., for allowing a user to interact with wireless signal capture and data analyzer device 102.

ATE 202 may represent any suitable entity or entities (e.g., software executing on at least one processor, an FPGA, an ASIC, or a combination of software, an ASIC, or an FPGA) for performing one or more aspects associated with analyzing log file data received. In some embodiments, ATE 202 may use a log file selected by a user such as log file 116 in log file data 212, where the log file includes various types of test related data (e.g., test session metrics, error codes, status messages from base station 110 and/or UE devices 112) and may access integrated troubleshooting data 210 for generating a troubleshooting report and/or resolution recommendations. In such embodiments, the troubleshooting report and/or resolution recommendations may be sent to RE 204 for displaying to a user or another entity. The troubleshooting report may include root causes identified for each error or issue. In some embodiments, ATE 202 may identify which root causes are related to RF and which root causes are related to protocol RE 204 may represent any suitable entity or entities (e.g., software executing on at least one processor, an FPGA, an ASIC, or a combination of software, an ASIC, or an FPGA) for performing one or more aspects associated with user interaction and/or reporting. For example, RE 204 may be configured to utilize GUI 118 to display or provide log file data analysis and/or a troubleshooting report. In this example, after a user selects an error or issue, RE 204 may display a determined root cause of the error or issue. In some embodiments, a resolution recommendation may include instructions for resolving an error or issue. In such embodiments, if instructions are scripted, RE 204 or another entity may allow a user to implement or execute the resolutions. In some embodiments, a resolution recommendation may include a guided walkthrough or advice for helping a user to implement the resolution.

In some embodiments, RE 204 may validate a resolution recommendation by performing a second test session and analyzing whether the same issue or error still occurred. For example, validation results from a related test session may indicate that a prior error or issue has been resolved or may indicate that the error or issue still exists or that a new error or issue is occurring.

In some embodiments, standards/technical specification data 206 may include error codes or information usable for indicating particular errors, issues, or failures (or types thereof), but may lack details regarding how or why the errors or failures occur and/or how to resolve them. For example, standards/technical specification data 206 may include information obtained, compiled, or derived from a standards body or technical specification data source, e.g., one or more 3GPP technical specification documents. In this example, standards/technical specification data 206 may include unique error codes or related identifiers obtained from the standards body or technical specification data source.

In some embodiments, technical support data 208 may include resolution information associated with various errors or issues and/or related data structures. For example, technical support data 208 may include information obtained, compiled, or derived from a technical support data source, e.g., a solutions database compiled by technical support technicians or users involved in software development or maintenance of a test platform or related test tool. In this example, technical support data 208 may be copied from an existing data store (e.g., an issue tracking system data store maintained by a test platform or tool manufacturer). Continuing with this example, technical support data 208 may include known issues and related root causes diagnosed and/or discerned by experts, programmers, or testers. In some embodiments, technical support data 208 may include recommendations or related data (e.g., written instructions, video instructions, and/or automated scripts) for fixing or resolving known errors or issues.

In some embodiments, integrated troubleshooting data 210 may include various troubleshooting data, e.g., associations between error codes (e.g., obtained from a standards body or technical specification data source) and resolution information (e.g., obtained from a technical support data source) and/or related data structures. For example, integrated troubleshooting data 210 may include root cause descriptions, resolution descriptions, and resolution information or recommendations. In some embodiments, resolution information may include instructions for adjusting one or more test settings or parameters associated with a test platform or related tool and/or adjusting settings, changing configurations, or running diagnostics on base station 110 and/or UE devices 112. In some embodiments, integrated troubleshooting data 210 may be generated using data obtained from standards/technical specification data 206 and technical support data 208. Integrated troubleshooting data 210 may identify which error codes are associated with RF issues and which error codes are associated with protocol issues. Integrated troubleshooting data 210 may identify the configuration issues in Base station 114 or UE 112. In some embodiments, integrated troubleshooting data 210 may include tables correlating errors codes, error descriptions, root causes, resolution codes, probable solutions, resolution targets, data sources, and/or and whether the error codes/root causes are associated with RF issues or protocol issues.

In some embodiments, log file data 212 may include one or more data structures containing log files and/or related test session information. For example, log file data 212 may include a number of log files from test sessions performed by a related test platform or tester. Log file data 212 may include log file 116 storing parameters 114 from captured IQ signals 108.

In some embodiments, an analysis algorithm may identify an error or failure issue and may analyze integrated troubleshooting data 210 to identify similar or corresponding reasons for the issue and/or resolution recommendations. For example, an analysis algorithm may analyze a log file for error information (e.g., an error code or indicator) and then may use the error information to search a data store (e.g., containing integrated troubleshooting data 210) for potentially relevant (e.g., similar) causes and/or solutions. In this example, the analysis algorithm may correlate a number of error codes with one or more corresponding resolution codes.

In some embodiments, an analysis algorithm may utilize any technique or algorithm that identifies an error code from log file data and uses the error code to identify possible solutions and/or causes. For example, an analysis algorithm may use heuristics to identify similar error codes to an error code found in a log file and then may search for known solutions related to the error code and any related error codes (e.g., by searching data 210 using a lookup key based on an error code, an error code portion, or another identifier). In some embodiments, identifying related error codes may occur when possible solutions and/or causes are not readily known for a particular error code in log file data. In other embodiments, identifying related error codes may be done regardless of whether a known solution exists for a particular error code. In these embodiments, possible solutions and/or causes associated with related error codes may be provided or presented as alternate possible solutions.

In some embodiments, an analysis algorithm may utilize a machine learning based linear regression algorithm. For example, wireless signal capture and data analyzer device 102 or ATE 202 may utilize a trained linear regression algorithm for obtaining or identifying error or codes from a standards body or technical specification data source. In this example, error or codes may be input and a predicted value (e.g., a same code, an equivalent code, or a similar code) may be the output, where a best fit for this algorithm may result in the algorithm outputting the same code as the input for most (if not all) input. In some embodiments, a machine learning based linear regression algorithm may be used to translate error codes from one numbering system to another numbering system, e.g., 3GPP error codes to a proprietary error code numbering system; e.g., issue numbers assigned by an issue tracking system.

In some embodiments, an analysis algorithm may utilize a machine learning based classification algorithm. For example, wireless signal capture and data analyzer device 102 or ATE 202 may utilize a trained Naive Bayes algorithm for obtaining or identifying one or more resolution recommendations (e.g., a set of potential error or issue reasons) using an error code or a related error code. In some embodiments, a trained Naive Bayes algorithm may use a posterior probability to predict the probability of different categories (e.g., resolutions or error reasons) based on various features (e.g., error code(s) or type of error(s)). For example, when testing a 5G mobile network, a secondary cell group (SCG) failure during a new radio (NR) cell addition can be caused by multiple reasons. In this example, these reasons may have one or more sub reasons and may also corresponding to one or more possible resolutions. Continuing with this example, a trained Naive Bayes algorithm can predict the most relevant causes for the SCG failure.

In some embodiments, a trained Naive Bayes algorithm, a trained linear regression algorithm, or another analysis algorithm may learn or determine error codes that are related to a source error code from log file data, e.g., by identifying similar error descriptions, by identifying similar error code numbering, or by analyzing patterns or connections in existing or predetermined (e.g., human-verified) error code associations). In such embodiments, the analysis algorithm may then correlate or associate the source error code with one or more resolutions (e.g., resolution codes) associated with the source error code and/or the learned related error codes using data derived or obtained from technical support data 208 or integrated troubleshooting data 210.

It will be appreciated that FIG. 2 is for illustrative purposes and that various depicted entities, their locations, and/or their functions described above in relation to FIG. 2 may be changed, altered, added, or removed. For example, in some embodiments, RE 204 and ATE 202 may be combined into a single module. It will also be appreciated that various entities in FIG. 2 may obtain or access any relevant data, including various types of data described above.

Figures 3A, 3B:
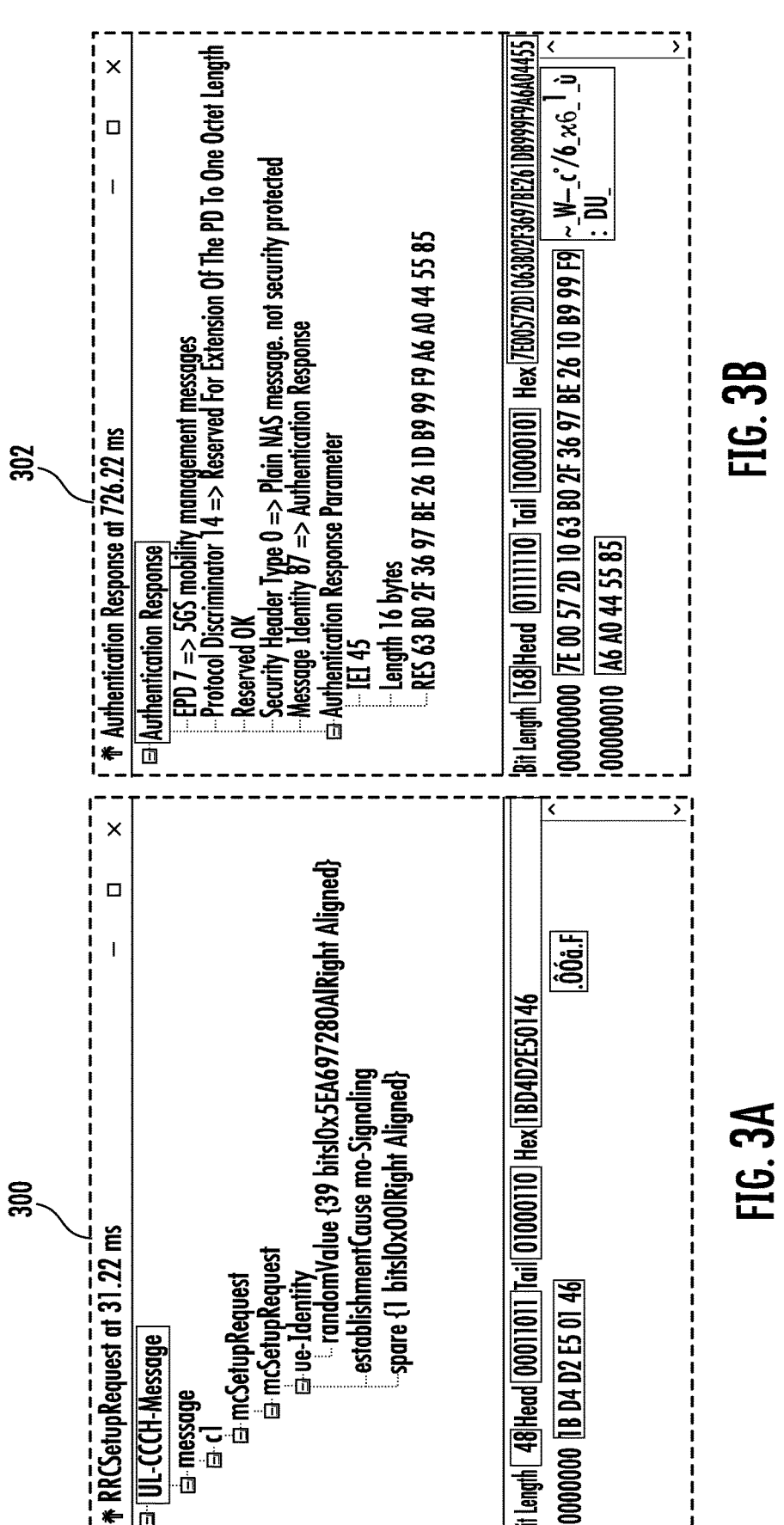
FIGS. 3A-3C are diagrams illustrating embodiments of graphical user interfaces displaying RRC messages.
Figure 3C:
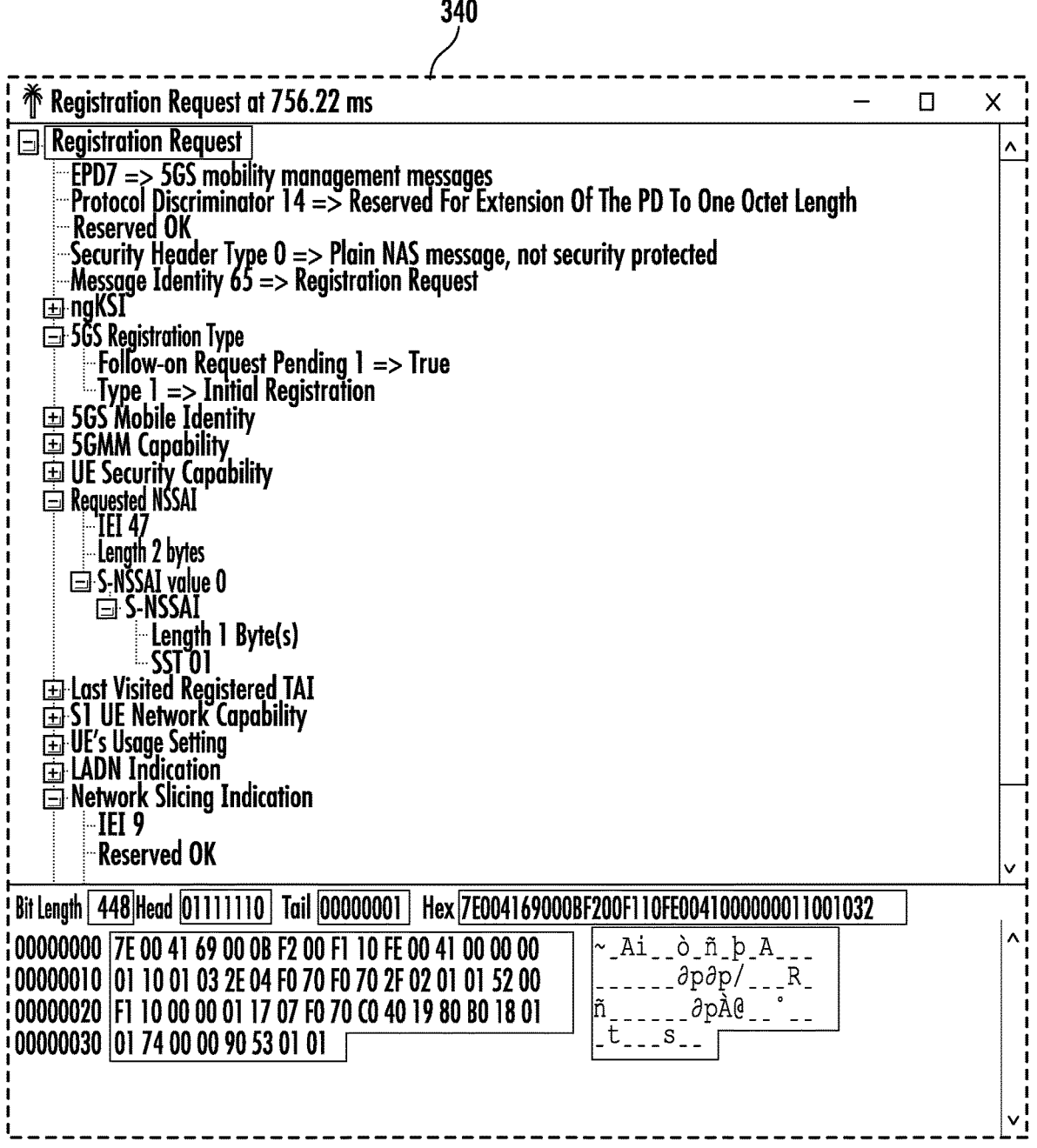

FIGS. 3A-3C show exemplary displays 300, 320, and 340 on GUI 118 of RRC messages received by wireless signal capture and data analyzer device 102. Display 300 shows details of a setup request message from UE device 112 to base station 110 sent on the uplink Common Control Channel (CCCH). Display 320 in FIG. 3B lists details of an authentication response message. FIG. 3C shows display 340 with details of a registration request message from UE device 112 to join the network.

Figure 4A:
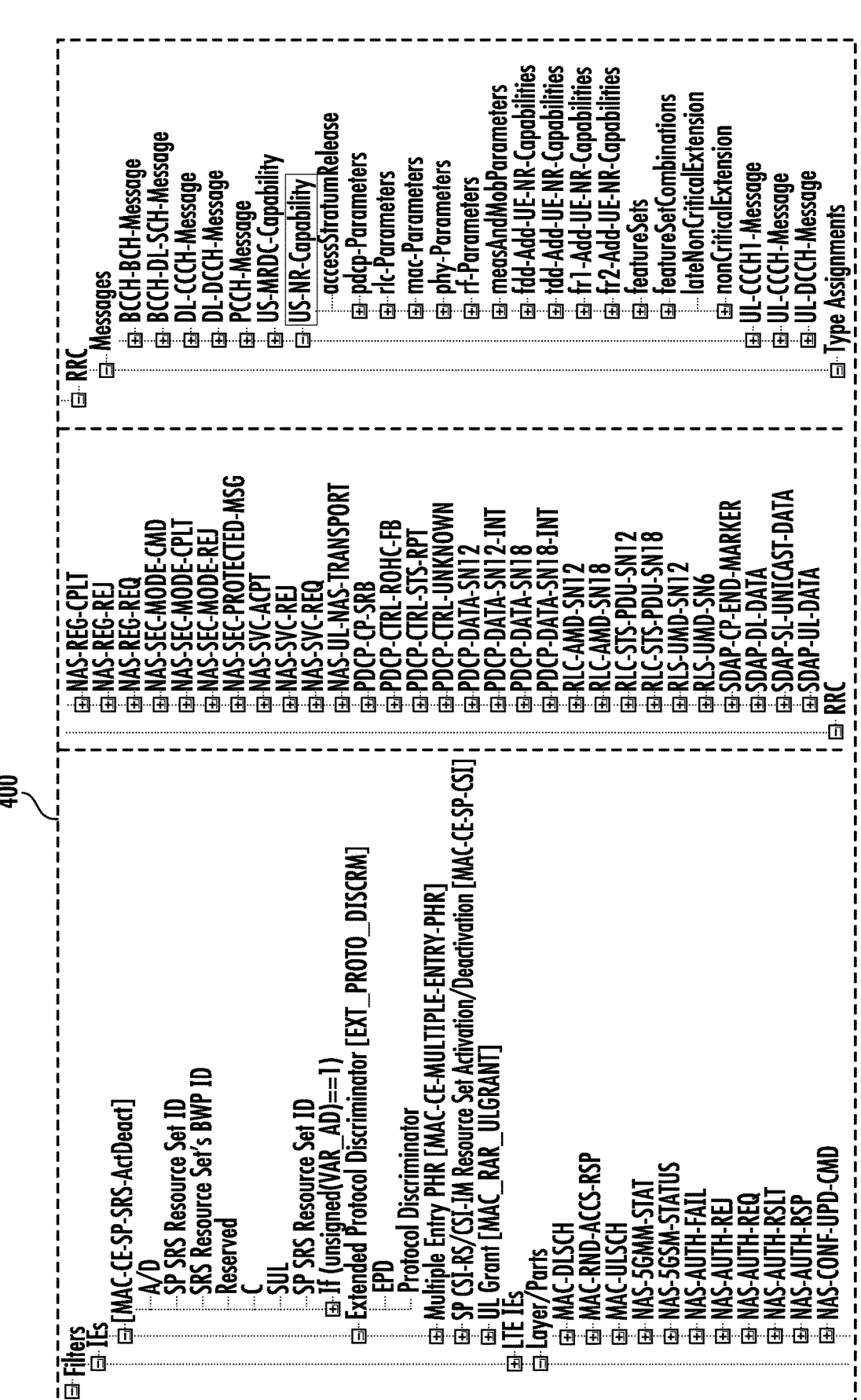
FIGS. 4A-4B are diagrams illustrating embodiments of graphical user interfaces displaying Information Elements.
Figure 4B:
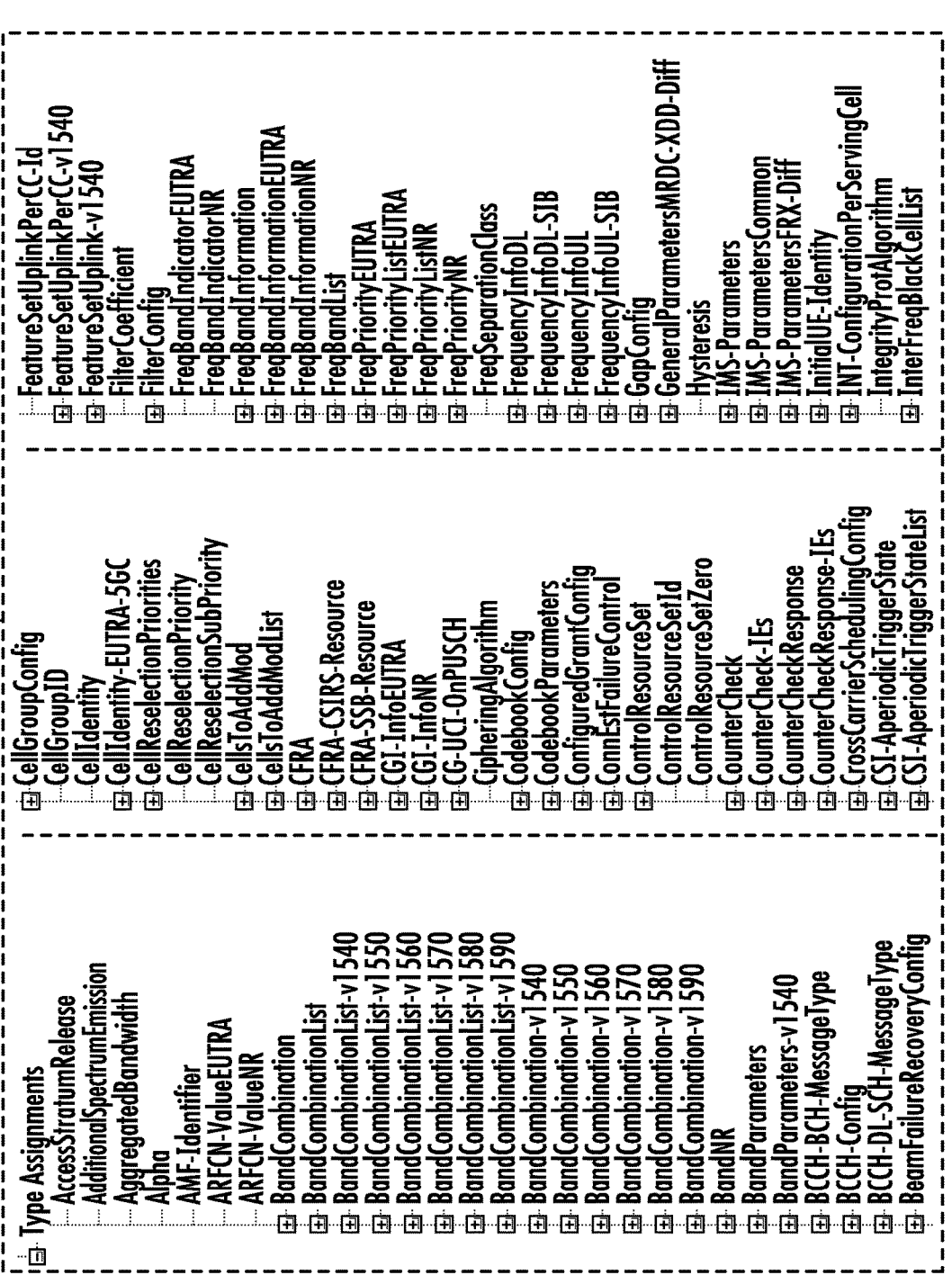

FIGS. 4A-4B illustrate displays 400 and 420 of graphical user interfaces GUI 118 displaying Information Elements. As described herein, IEs may be included in IQ signals 108 and may be captured by wireless signal capture and data analyzer device 102 or from an imported log file. In some embodiments, all IEs are parameters 120 from which a user may select as first user input 120.

FIG. 5 shows an exemplary display 500 on GUI 118 of listed messages from the physical layer of the network that wireless signal capture and data analyzer device 102 captured, including Physical Downlink Shared Channel (PDSCH), Physical Uplink Shared Channel (PUSCH), Physical Random Access Channel (PRACH), Physical Downlink Control Channel (PDCCH), and various Downlink Control Information (DCI) formats. FIG. 5 shows DCI Format 0_0 listed once and DCI Format 0_1 listed eight times. User can select a specific format, such as DCI Format 0_1, as first user input 120 and "count" as second user input 124 to which wireless signal capture and data analyzer device 102 outputs a count of eight.

Figures 6A, 6B:
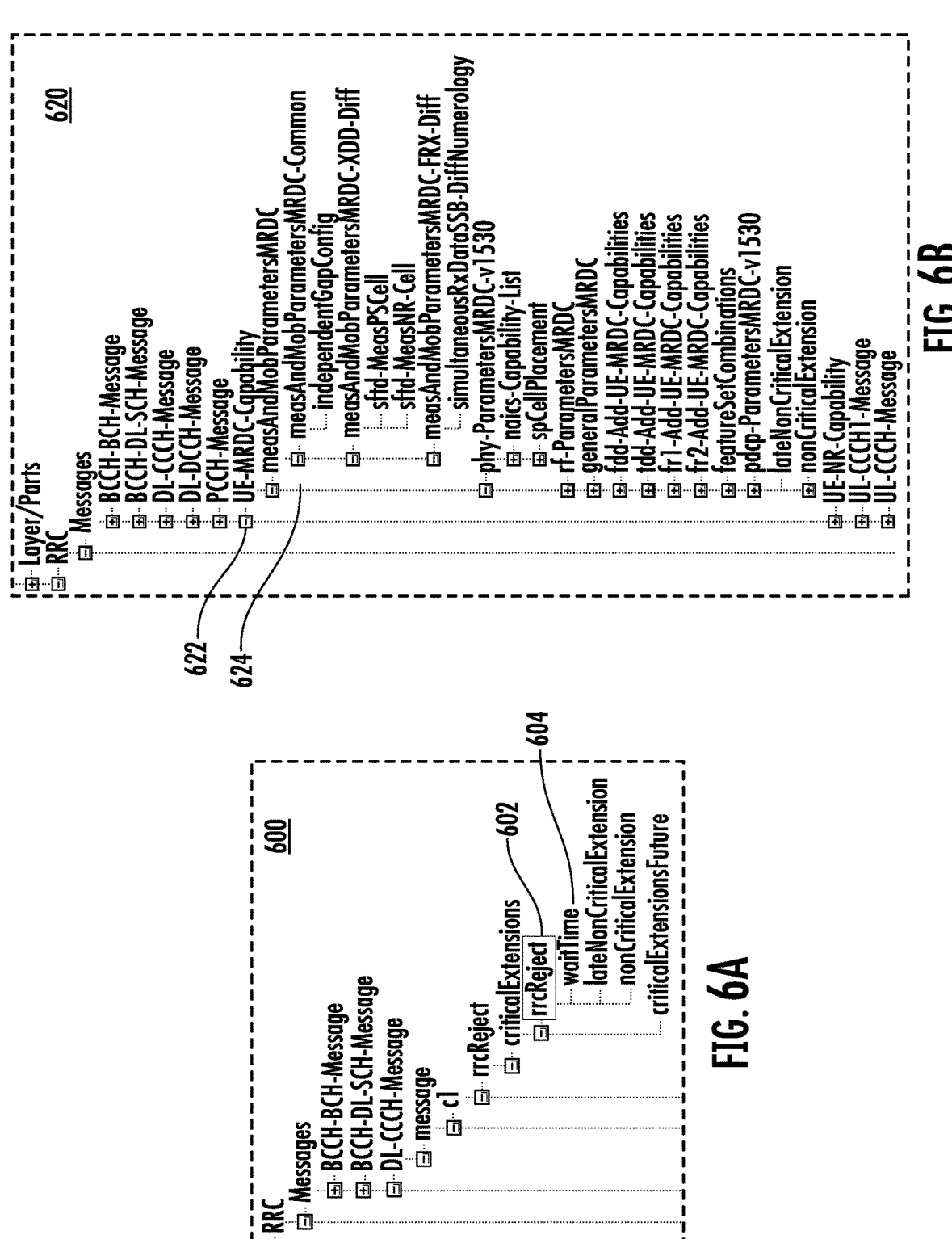
FIG. 6A-6C are diagrams illustrating embodiments of graphical user interfaces displaying RRC messages and parameters.
Figure 6C:
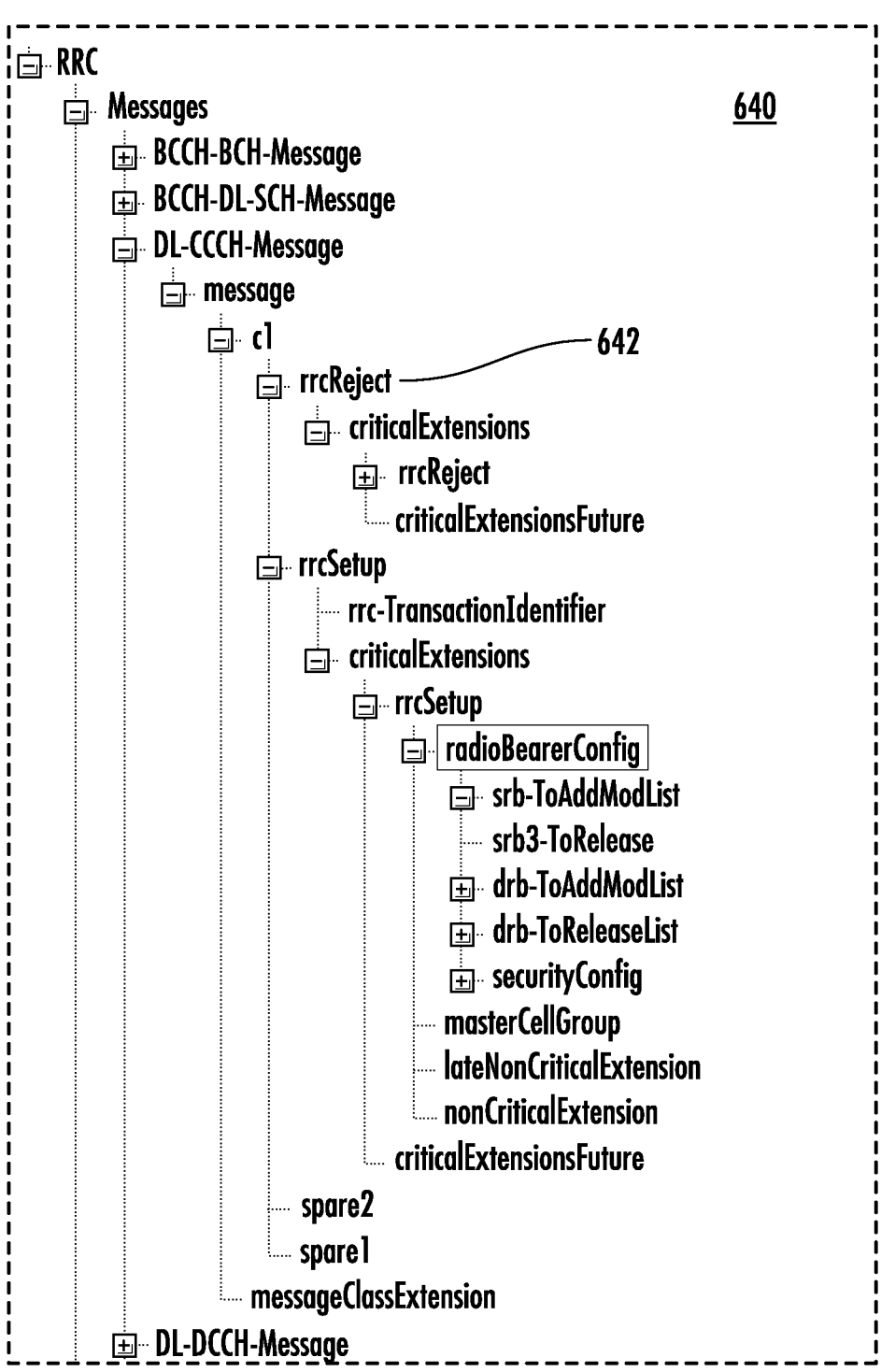

FIGS. 6A-6C illustrate additional exemplary displays 600, 620, and 640 on GUI 118 of RRC messages received by wireless signal capture and data analyzer device 102. RRC messages listed in display 600 in FIG. 6A include RRC reject message 602. RRC reject messages are messages used to reject the RRC connection establishment in response to an UE's RRC connection request. There could be a number of causes for the rejection, such as the cell is congested, the necessary radio resources for the connection setup cannot be provided, the eNodeB (eNB) in a 4G network or the gNB in a 5G network is overloaded, or the RRC connection setup timer expired. Under the listed RRC reject message 602 is additional related information such as wait time 604, which provides the wait time parameter defining how long the UE device 112 should wait after receiving the RRC connection reject before sending a new RRC connection request message. A user may select RRC reject message 602 as parameter 114 for first user input 120 to view information pertaining the RRC reject messages 602 received, such as the quantity of RRC reject messages received if user selects count for second user input 124.

RRC messages in FIG. 6B includes IE 622 and selectable parameter "UE-MRDC-Capability," which signals that UE device 112 supports E-UTRAN New Radio—Duel Connectivity (EN-DC) and can simultaneously connect to a 4G base station and a 5G base station. Below this IE 622 is listed its value section 624 "measAndMobParametersMRDC-Common" and "independentGapConfig" that identifies whether UE device 112 supports independent gap measurement configurations for FR1 and FR2. Display 640 in FIG. 6C lists RRC messages with multiple IEs that can be selected as parameters 114 including RRC reject message 642 with values for "criticalExtensionsFuture".

FIG. 7 is a diagram of system 700 illustrating an exemplary topology of wireless signal capture and data analyzer device 102 using an over the air (OTA) mode to capture IQ signals. A first receiver 702 and a second receiver 704 receive millimeter (mm) wave signals transmitted by base station 110, such as the 5G gNB functioning as a base station shown in FIG. 7. The mm wave signals received by first receiver 702 and second receiver 704 are carried to a first signal converter 706 and a second signal converter 708, respectively, which convert the mm wave signals to intermediate frequency (IF) signals for downlink. Wireless signal capture and data analyzer device 102 is connected to first and second signal converters 706 and 708 and receives the IF signals from first signal converter 706 and second signal converter 708. A third receiver 710 receives mm wave signals transmitted by UE device 112. The mm wave signals are converted by a third signal converter 712 to IF signals for uplink and are sent to wireless signal capture and data analyzer device 102.

FIG. 8 is a diagram of system 800 illustrating an exemplary topology of wireless signal capture and data analyzer device 102 using a conducted mode to capture IQ signals. In conducted mode, wireless signal capture and data analyzer device 102 is physically connected, such as via wires, to UE device 112 and a network emulator 802, such as a 5G gNB emulator or a real gNB. Network emulator 802 is connected to a first Radio Frequency (RF) splitter 804, which splits a signal from the network emulator 802, such as a signal for downlink, and carries a first portion of the signal to real or emulated UE device 112 and a second portion of the signal to wireless signal capture and data analyzer device 102. Network emulator 802 is also connected to a second RF splitter 806 that splits a signal received from the network emulator 802, such as a signal for downlink, and carries a first portion of the signal to wireless signal capture and data analyzer device 102 and a second portion of the signal to a third RF splitter 808. Third RF splitter 808 is connected to UE device 112 and splits a signal from the UE device 112, such as a signal for uplink, and carries a first portion of the signal to wireless signal capture and data analyzer device 102 and a second portion of the signal to second RF splitter 806.

FIG. 9 is a flow chart of exemplary process 900 for analyzing and displaying wireless signal data captured by a wireless signal capture and data analyzer device. In some embodiments, process 900, or portions thereof, may be performed by or at wireless signal capture and data analyzer device 102. In step 902, wireless signal capture and data analyzer device 102 captures wireless IQ signals transmitted over an air interface between a real or emulated wireless base station and one or more real or emulated UE devices. In some embodiments, the wireless IQ signals may include RRC messages.

In step 904, wireless signal capture and data analyzer device 102 stores parameters from the captured IQ signals in a log file. Wireless signal capture and data analyzer device 102 may also receive IQ signals from imported log files.

In step 906, wireless signal capture and data analyzer device 102 provides a GUI that displays the parameters from the IQ signals and enables a user to select the parameters from the log file. Parameters may include parameters from the RRC messages and/or from various messages.

In step 908, wireless signal capture and data analyzer device 102 receives, via the GUI, a first user input for selecting one or more of the parameters from the log file. The first user input may include input for selecting one of the parameters from the RRC messages.

In step 910, wireless signal capture and data analyzer device 102 provides, via the GUI, selectable operators for performing operations on the parameters.

In step 912, wireless signal capture and data analyzer device 102 receives, via the GUI, a second user input selecting one of the selectable operators. The second user input may include a statistical operator to perform on selected one or more parameters from the RRC messages. The statistical operator may include a count operator that generates a count of occurrences of the selected one or more parameters from the RRC messages. The second user input may include input for correlating the first and second parameters.

In step 914, wireless signal capture and data analyzer device 102 performs an operation corresponding to the selectable operator on the one or more parameters and generates an output. The output may include a graph that displays a correlation between values of the first and second parameters.

In step 916, wireless signal capture and data analyzer device 102 presents the output to the user via the GUI. The output may be presented simultaneously, such as side-by-side graphs of first and second parameters charted over time. The output may include numerical data in graphs and/or charts of the selected one or more parameters.

In some embodiments, a resolution recommendation may include a resolution description, a resolution target device, or one or more additional resolution recommendations.

In some embodiments, a data analyzer (e.g., wireless signal capture and data analyzer device 102) for performing process 900 or portions thereof may include a network test system, a network protocol tool, a protocol carrier acceptance tool, a protocol conformance tool, a radio frequency (RF) conformance test tool, a test platform, a test tool, or a log file data viewer.

In some embodiments, at least one resolution recommendation may be stored in a data structure accessible via an API or a UI (e.g., GUI 118). For example, integrated troubleshooting data 210 in data storage 105 may be accessible using a representational state transfer (REST) API or a web-based UI.

It will be appreciated that process 900 is for illustrative purposes and that different and/or additional actions may be used. It will also be appreciated that various actions described herein may occur in a different order or sequence.

It should be noted that wireless signal capture and data analyzer device 102, ATE 202, RE 204, and/or functionality described herein may constitute a special purpose computing device. Further, wireless signal capture and data analyzer device 102, ATE 202, RE 204, and/or functionality described herein can improve the technological field of network testing, including, e.g., troubleshooting testing issues and/or providing issue resolution recommendations. For example, wireless signal capture and data analyzer device 102 may receive one or more log files associated with testing base station 110 and/or UE devices 112 and may use one or more analysis algorithms (e.g., linear searching, key (e.g., error code) lookup, AI algorithms, and/or machine learning algorithms) to analysis log file data, determine a failure reason (e.g., an error code or other information), and/or determine, using the failure reason, at least one resolution recommendation from integrated troubleshooting data 210, e.g., correlated data obtained from multiple data sources, where the data includes failure reasons and corresponding resolution recommendations.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for analyzing and displaying wireless signal data captured by a wireless signal capture and data analyzer device, the method comprising:

at a wireless signal capture and data analyzer device:

capturing wireless in-phase and quadrature (IQ) signals transmitted over an air interface between a wireless base station and one or more real or emulated user equipment (UE) devices; wherein capturing the IQ signals includes capturing the IQ signals carrying Radio Resource Control (RRC) messages between the wireless base station and the one or more real or emulated UE devices;

storing parameters from the captured IQ signals in a log file;

providing a graphical user interface that displays the parameters from the IQ signals and enables a user to select the parameters from the log file, wherein the graphical user interface displays message types of the RRC messages, names of parameters from the RRC messages, and values of the parameters;

receiving, via the graphical user interface, a first user input for selecting one or more of the displayed parameters from the RRC messages, wherein receiving the first user input includes receiving input for selecting one of the displayed parameters from the RRC messages;

providing, via the graphical user interface, selectable operators for performing operations on the log file corresponding to the selected parameters from the RRC messages;

receiving, via the graphical user interface, a second user input selecting one of the selectable operators, wherein the second user input comprises input selecting a statistical operator indicating an operation to perform on the log file for the selected one of the displayed parameters from the RRC messages and the statistical operator includes a count operator that generates a count of occurrences of the selected one of the displayed parameters from the RRC messages;

performing an operation on the log file, wherein performing the operation includes applying the statistical operator to the log file and generating the count of the occurrences of the selected one of the displayed parameters from the RRC messages; and presenting the count of the occurrences to the user via the graphical user interface.

2. The method of claim 1, wherein receiving the first user input includes receiving input for selecting a first parameter and a second parameter from the RRC messages.

3. The method of claim 2, wherein receiving the second user input includes receiving input for correlating the first and second parameters.

4. The method of claim 3, wherein generating the output includes generating a graph that displays a correlation between values of the first and second parameters.

5. A system for analyzing and displaying wireless signal data captured by a wireless signal capture and data analyzer device, the system comprising:

a processor;

a memory communicatively connected to the processor; and a wireless signal capture and data analyzer device implemented using the processor and the memory, wherein the wireless signal capture and data analyzer device is configured for:

capturing wireless in-phase and quadrature (IQ) signals transmitted over an air interface between a wireless base station and one or more real or emulated user equipment (UE) devices; wherein capturing the IQ signals includes capturing the IQ signals carrying Radio Resource Control (RRC) messages between the wireless base station and the one or more real or emulated UE devices;

storing parameters from the captured IQ signals in a log file;

providing a graphical user interface that displays the parameters from the IQ signals and enables a user to select the parameters from the log file, wherein the graphical user interface displays message types of the RRC messages, names of the parameters from the RRC messages, and values of the parameters;

receiving, via the graphical user interface, a first user input for selecting one or more of the displayed parameters from the RRC messages, wherein receiving the first user input includes receiving input for selecting one of the displayed parameters from the RRC messages;

providing, via the graphical user interface, selectable operators for performing operations on the log file corresponding to the selected parameters from the RRC messages;

receiving, via the graphical user interface, a second user input selecting one of the selectable operators, wherein the second user input comprises input selecting a statistical operator indicating an operation to perform on the log file for the selected one of the displayed parameters from the RRC messages and the statistical operator includes a count operator that generates a count of occurrences of the selected one of the displayed parameters from the RRC messages;

performing an operation on the log file, wherein performing the operation includes applying the statistical operator to the log file and generating the count of the occurrences of the selected one of the displayed parameters from the RRC messages; and presenting the count of the occurrences to the user via the graphical user interface.

6. The system of claim 5, wherein receiving the first user input includes receiving input for selecting a first parameter and a second parameter from the RRC messages.

7. The system of claim 6, wherein receiving the second user input includes receiving input for correlating the first and second parameters.

8. The system of claim 7, wherein generating the output includes generating a graph that displays a correlation between values of the first and second parameters.

9. A non-transitory computer readable medium having stored thereon executable instructions that when executed by at least one processor of at least one computer cause the at least one computer to perform steps comprising:

capturing wireless in-phase and quadrature (IQ) signals transmitted over an air interface between a wireless base station and one or more real or emulated user equipment (UE) devices; wherein capturing the IQ signals includes capturing the IQ signals carrying Radio Resource Control (RRC) messages between the wireless base station and the one or more real or emulated UE devices;

storing parameters from the captured IQ signals in a log file;

providing a graphical user interface that displays the parameters from the IQ signals and enables a user to select the parameters from the log file, wherein the graphical user interface displays message types of the RRC messages, names of the parameters from the RRC messages, and values of the parameters;

receiving, via the graphical user interface, a first user input for selecting one or more of the displayed parameters from the RRC messages, wherein receiving the first user input includes receiving input for selecting one of the displayed parameters from the RRC messages;

providing, via the graphical user interface, selectable operators for performing operations on the log file corresponding to the selected parameters from the RRC messages;

receiving, via the graphical user interface, a second user input selecting one of the selectable operators, wherein the second user input comprises input selecting a statistical operator indicating an operation to perform on the log file for an operation to perform on the log file for the selected one of the displayed parameters from the RRC messages and the statistical operator includes a count operator that generates a count of occurrences of the selected one of the parameters from the RRC messages;

performing an operation on the log file corresponding to the selectable operator and the one or more selected parameters from the RRC messages and generating an output, wherein performing the operation includes applying the statistical operator to the log file and generating the count of the occurrences of the selected one of the displayed parameters from the RRC messages; and presenting the count of the occurrences to the user via the graphical user interface.

* * * * *